March 22, 1927.
J. D. VAN DERWYK
VEHICLE BRAKE
Filed May 18, 1925
1,621,912
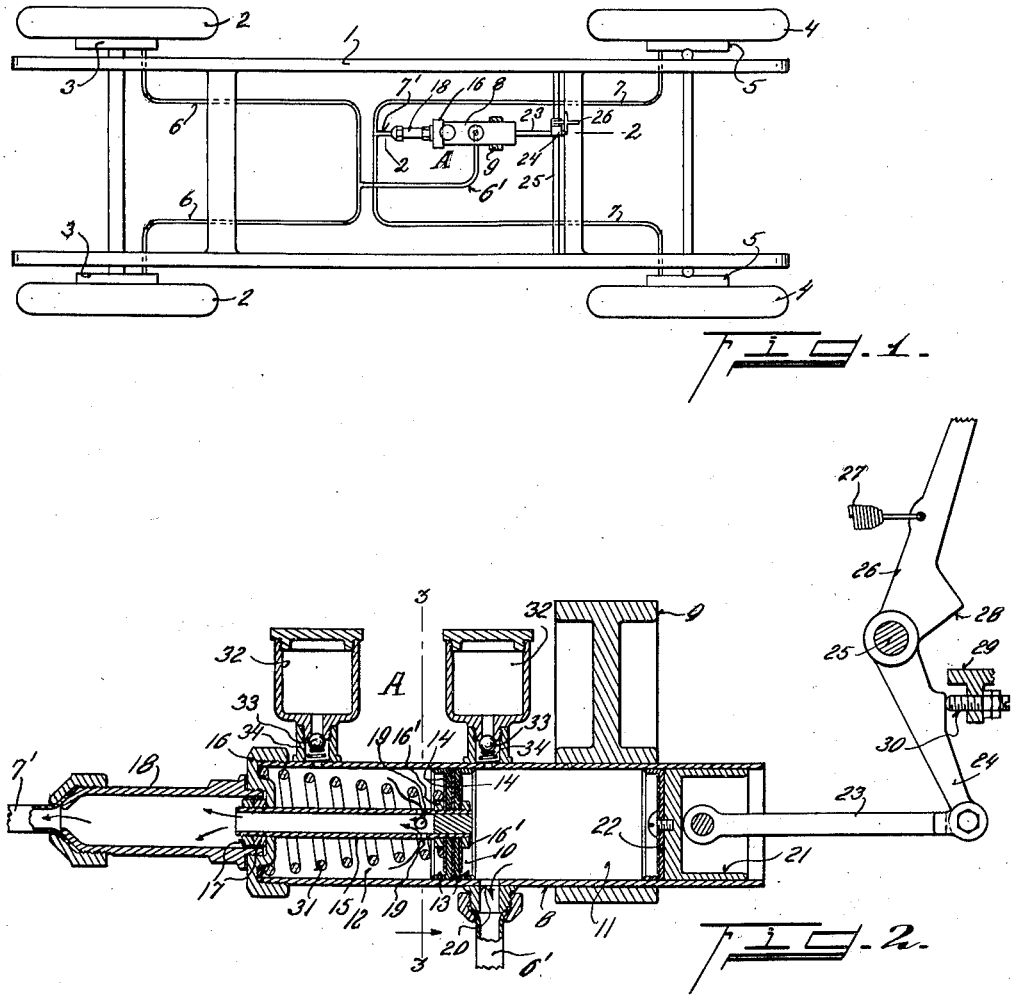
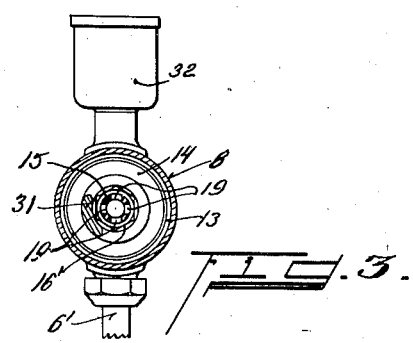
INVENTOR.
John D. Van Derwyk
BY Clarence B. Foster
ATTORNEY.

Patented Mar. 22, 1927.

1,621,912

UNITED STATES PATENT OFFICE.

JOHN D. VAN DERWYK, OF LOS ANGELES, CALIFORNIA, ASSIGNOR TO THOMAS A. WELLS, OF LOS ANGELES, CALIFORNIA.

VEHICLE BRAKE.

Application filed May 18, 1925. Serial No. 31,073.

This invention relates to vehicle brakes and is particularly directed to a four-wheel brake of the hydraulic type adaptable for use on motor vehicles.

It is an object of the present invention to provide a four-wheel brake in which the brake devices are connected in front and rear pairs and to provide a pressure device operable to cause an initial independent braking of the one pair of wheels and a subsequent simultaneous braking of both pairs of wheels.

It is a further object to provide an automatic control by which the power of such initial independent braking is predetermined and by which the relative braking power transmitted to both pairs of wheels is governed.

A further object is to make provisions for compensating for leakage of fluid from the chambers and conduit.

Various other objects and advantages will be more fully apparent from the following description of the accompanying drawings which illustrate a preferred form of embodiment of the invention, and which form a part thereof.

Of the drawings;

Fig. 1 is a plan view of a conventional type of motor vehicle, showing the apparatus of the present invention applied thereto.

Fig. 2 is an enlarged section on line 2—2 of Fig. 1.

Fig. 3 is a transverse section on line 3—3 of Fig. 2.

Referring to Fig. 1 of the drawings, 1 designates the frame of the vehicle, 2 designates the rear wheels having associated therewith pressure operated brake devices 3, and 4 designates the front wheels having associated therewith pressure operated brake devices 5, these several brake devices being of any desired specific type adapted to be operated by pressure transmitted thereto by pressure lines. In the arrangement illustrated in the drawings, the brake devices are connected in front and rear pairs, the rear brake devices being connected by conduits 6 and the front brake devices being connected by conduits 7.

The means by which the several brakes are operated, comprises a pressure device indicated generally by the reference character A, and the medium utilized for transmitting pressure to the brake devices is preferably a fluid (such as oil) contained in the several conduits and in the pressure device.

In its preferred form, the pressure device consists of a cylinder 8 suitably supported on the framework of the vehicle, as by a bracket 9, and containing therein a slidable partition piston 10 dividing the cylinder into a main pressure chamber 11 and a secondary pressure chamber 12, said partition piston comprising two oppositely disposed cup leathers 13 and three supporting washers 14, all clamped upon the forward end of a piston rod 15, by opposed nuts 16'. The piston rod 15 extends rearwardly through a central bore in a cap 16 screwed on the rear end of the cylinder, and beyond said cap the piston rod has two lock nuts 17 screwed upon its outer end and constituting a stop which engages the cap 16 to limit the forward movement of the piston 10, thus the cap serves both as a closure for the cylinder and as a stationary stop abutment. Screwed into the cap 16 is a sleeve 18 into which the piston rod projects during its rearward travel and which is in constant communication with the chamber 12 through the bore of the piston rod and the ports 19 formed in the wall of the piston rod near the piston 10.

The front brake conduits 7 communicate through a branch conduit 7' with the sleeve 18 and the rear brake conduits 6 communicate through a branch conduit 6' with a port 20 in the rear end of the chamber 11, and in the forward end of the chamber 11 there is provided a pressure piston 21 having secured to its inner face a cup leather 22. This pressure piston is slidable in the chamber 11 and is connected by a link 23 to the lower end of a brake lever 24 secured on a brake shaft 25; and is operated by a manually operated brake pedal 26 also secured on said brake shaft.

The brake pedal and connected parts are returned to normal position by a suitable spring 27 and the movements of the pressure piston 21 are limited in one direction by a stop 28 on the pedal 26 engaging a portion 29 of the frame and in the reverse direction by engagement of the brake lever 24 with an adjustable stop bolt 30 supported on the frame.

The automatic control means for the brake operation comprises a coil spring 31 interposed between the cap 16 and the partition piston 10, this spring functioning to prevent movement of the piston 10 to operate the front brakes, until a predetermined pressure is first built up in the chamber 11 and transmitted to the rear brakes.

Assuming that it is desired to apply a ten pound pressure to the rear brakes before applying any braking pressure to the front brakes, the spring 31 will in such case have an initial tension of ten pounds plus the area of the partition piston.

In this arrangement, movement of the brake pedal 26 will translate the pressure piston 21 rearwardly in the cylinder to build up an initial pressure in the main pressure chamber 11 and connected conduits and brake devices and effect a braking of the rear wheels. Such building up of pressure in the chamber 11 continues until a braking pressure of ten pounds is exerted on the rear brake devices, during which time the control spring 31 maintains the partition piston 10 stationary. This braking of the rear wheels only, will suffice for the ordinary requirements for checking the speed of the vehicle.

Upon further depression of the brake pedal the pressure in the chamber 11 will be built up beyond said initial ten pounds and the partition piston will then be translated rearwardly to build up pressure in the secondary pressure chamber 12 and in the conduits and brake devices of the front wheels, thus effecting a simultaneous operation of all the brake devices.

At times there may be a slight leakage of fluid which would in time render the apparatus inoperative, and to guard against such occurrence, I have provided automatic means for compensating for such leakage and for at all times maintaining in the apparatus a full supply of operating fluid. Such means comprises a supply chamber 32 for each of the pressure chambers 11 and 12, each of said supply chambers communicating with a respective pressure chamber and having a check valve 33 permitting flow of fluid only from said supply chamber into its companion pressure chamber. Each of the valves 33 is maintained closed by a spring 34, and it will be evident that if a leak occurs, fluid will be forced from the apparatus upon the power stroke of the respective piston, and that the subsequent return stroke thereof will create a suction in that side of the apparatus in which the leak occurs, which suction will open the valve 33 and draw into the respective pressure chamber sufficient fluid to compensate for the leakage. The chambers 32 are provided with removable cover plates to facilitate refilling of the supply chambers.

While the specific form of embodiment herein illustrated and described is well adapted to fulfill all of the objects primarily stated, it is to be understood that I do not wish to limit the invention in this regard for it is susceptible of embodiment in various other forms all coming within the scope of the following claims.

I claim as my invention:

1. A four-wheel brake for vehicles, comprising pressure operated brake devices associated with the respective wheels, conduits connecting said brake devices in pairs, a pressure device comprising a cylinder containing a slidable partition piston dividing the cylinder into a main pressure chamber and a secondary pressure chamber, said main chamber communicating with the conduits leading to one pair of said brake devices and said secondary chamber communicating with the conduits leading to the other pair of said brake devices, a pressure piston in the main chamber, and control means maintaining the partition piston against movement until an initial braking pressure is first built up in the main pressure chamber by movement of the pressure piston and transmitted to the said one pair of brake devices, said control means permitting subsequent movement of the partition piston upon further movement of the pressure piston to build up pressure in both pressure chambers for transmission to both pairs of brake devices.

2. A four-wheel brake for vehicles, comprising pressure operated brake devices associated with the respective wheels, conduits connecting said brake devices in pairs, a pressure device comprising a cylinder containing a slidable partition piston dividing the cylinder into a main pressure chamber communicating with the conduits leading to one pair of said brake devices and a secondary pressure chamber communicating with the conduits leading to the other pair of said brake devices, a pressure piston operable to build up pressure in the main chamber for transmission to the one pair of brake devices, said partition piston being operable by pressure in the main chamber to build up pressure in the secondary chamber for transmission to the other pair of brake devices, and yielding means restraining the partition piston against movement until a predetermined pressure is first built up in the main chamber and transmitted to the said one pair of brake devices.

3. A four-wheel brake for vehicles, comprising pressure operated brake devices associated with the respective wheels, conduits connecting said brake devices in pairs, a pressure device comprising a main pressure chamber in communication with the conduits leading to one pair of said brake devices and a secondary pressure chamber in communication with the conduits leading to the other pair of said brake devices, automatic control means between said chambers for preventing a building up of pressure in said secondary chamber and its associated brake devices until an initial braking pressure is first built up in the main chamber and its associated brake devices, and automatic means for replenishing the fluid supply in the chambers and associated conduits.

In testimony whereof, I have hereunto set my hand at Glendale, California, this 11th day of May, 1925.

JOHN D. VAN DERWYK.